AUTOMATIC ADJUSTING SYSTEM OF TUNED AMPLIFIER

Filed Nov. 28, 1967 5 Sheets-Sheet 1

INVENTOR
KATSUTOSHI IWAHARA

BY *Wenderoth, Lind & Ponack*
ATTORNEYS

INVENTOR
KATSUTOSHI IWAHARA

BY Wenderoth, Lind & Ponack
ATTORNEYS

INVENTOR
KATSUTOSHI IWAHARA

BY Wenderoth, Lind & Ponack
ATTORNEYS

AUTOMATIC ADJUSTING SYSTEM OF TUNED AMPLIFIER

Filed Nov. 28, 1967 5 Sheets-Sheet 4

INVENTOR
KATSUTOSHI IWAHARA

BY Wenderoth, Lind & Ponack
ATTORNEYS

Dec. 16, 1969 KATSUTOSHI IWAHARA 3,484,707

AUTOMATIC ADJUSTING SYSTEM OF TUNED AMPLIFIER

Filed Nov. 28, 1967 5 Sheets-Sheet 5

INVENTOR
KATSUTOSHI IWAHARA

BY Wenderoth, Lind & Ponack
ATTORNEYS

United States Patent Office 3,484,707

Patented Dec. 16, 1969

3,484,707

AUTOMATIC ADJUSTING SYSTEM OF TUNED AMPLIFIER

Katsutoshi Iwahara, Neyagawa-shi, Japan, assignor to Matsushita Electric Industrial Co., Ltd., Kadoma, Osaka, Japan Filed Nov. 28, 1967, Ser. No. 686,014
Claims priority, application Japan, Dec. 12, 1966, 41/82,327
Int. Cl. G01r *23/08*
U.S. Cl. 330—2 11 Claims

ABSTRACT OF THE DISCLOSURE

An automatic adjusting system for adjusting a tuned amplifier having tuning means comprising a mounting head having an input and an output terminal and adjusting means for adjusting the tuning means of said amplifier, *n* test frequency oscillators each generating an electric signal, *n* first switches for scanning said electric signals and sequentially connecting the respective oscillators to the input terminal of said mounting head, *n* second switches adapted to operate synchronously with said first switches, driving means coupled to said first and second switches and generating a scanning signal for said first and second switches, *n* memory circuits sequentially connected to the output terminal of said mounting head by said *n* second switches and storing the amplitude of a detected signal corresponding to the respective electric signals appearing at said output terminal, signal conversion means coupled to said memory circuits and said adjusting means for generating adjusting signals and supplying them to said adjusting from the output signals of said memory circuits, said adjusting means comprising means for electro-mechanically adjusting the tuning means of the amplifier to adjust the gain-frequency characteristics of said tuned amplifier to a desired pattern.

This invention relates to automatic adjusting systems for adjusting gain-frequency characteristics of tuned amplifiers such as single-tuned, double-tuned, stagger-tuned and stagger damped double-tuned amplifiers. These amplifiers are generally used as intermediate frequency amplifiers in wireless equipment. Such amplifiers always require the adjustment of the gain-frequency characteristic after assembling. These adjustments are generally carried out by a skilled operator. On the other hand, automatic assembling techniques for electronic devices have been developed over the past several years. When equipment is assembled automatically, it is more profitable to automate the adjusting process for the tuned amplifiers. It would be easy to provide an adjusting system capable of adjusting the gain frequency characteristic stage by stage and obtain an overall characteristic fairly close to the standard one. But this method cannot be applied without producing disturbances in the gain-frequency characteristic of the amplifier to be adjusted, because it is necessary for such a system to be connected to the intermediate stages of the amplifier to be adjusted. Such a disturbance interrupts the precise adjustment of the gain-frequency characteristic.

Therefore, an object of the present invention is to provide an automatic adjusting system which automatically adjusts the gain-frequency characteristic of the tuned amplifier contained in many kinds of electronic equipment.

A further object of the present invention is to provide an automatic adjusting system capable of adjusting the gain-frequency characteristic of the tuned amplifier to be adjusted with a high degree of uniformity.

A still further object of the present invention is to provide an automatic adjusting system capable of adjusting the gain-frequency characteristic of the tuned amplifier at a very high speed by adjusting simultaneously all of the turnable elements which have an effect on the gain-frequency characteristic.

These and other objects of the invention will be clear from the following detailed description taken together with the accompanying drawings wherein:

FIG. 1 is the block diagram illustrating an automatic adjusting system adapted to tune a tuned amplifier;

FIGS. 2*a, b,* and *c* are graphs illustrating a standard gain-frequency characteristic curve, a weighting coefficient and a gain-frequency characteristic of a tuned amplifier to be adjusted, respectively;

Figure 4:
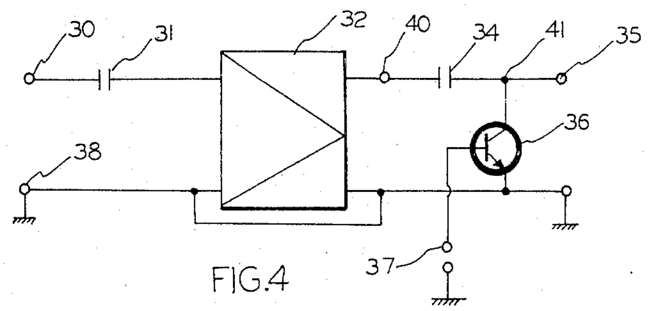
FIG. 4 illustrates a clamping circuit for D.C. restoration of the detected signal comprising an A.C. amplifier, which is used when an amplifier to be adjusted is provided with a D.C. bias voltage superposed on a detected signal.
Figure 5A:
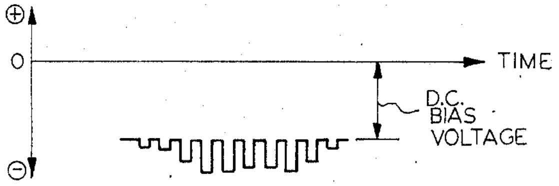
Figure 5B:
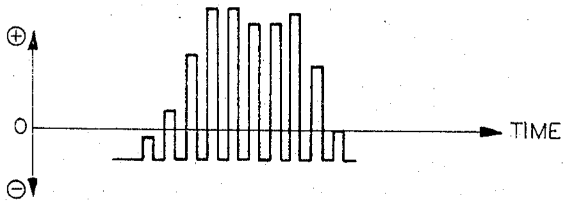
Figure 5C:
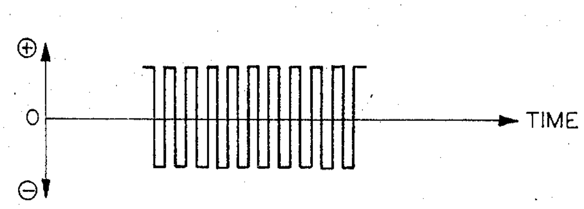
Figure 5D:
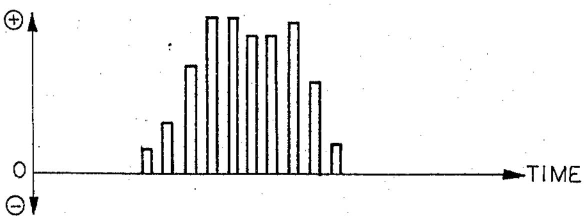
Figure 6:
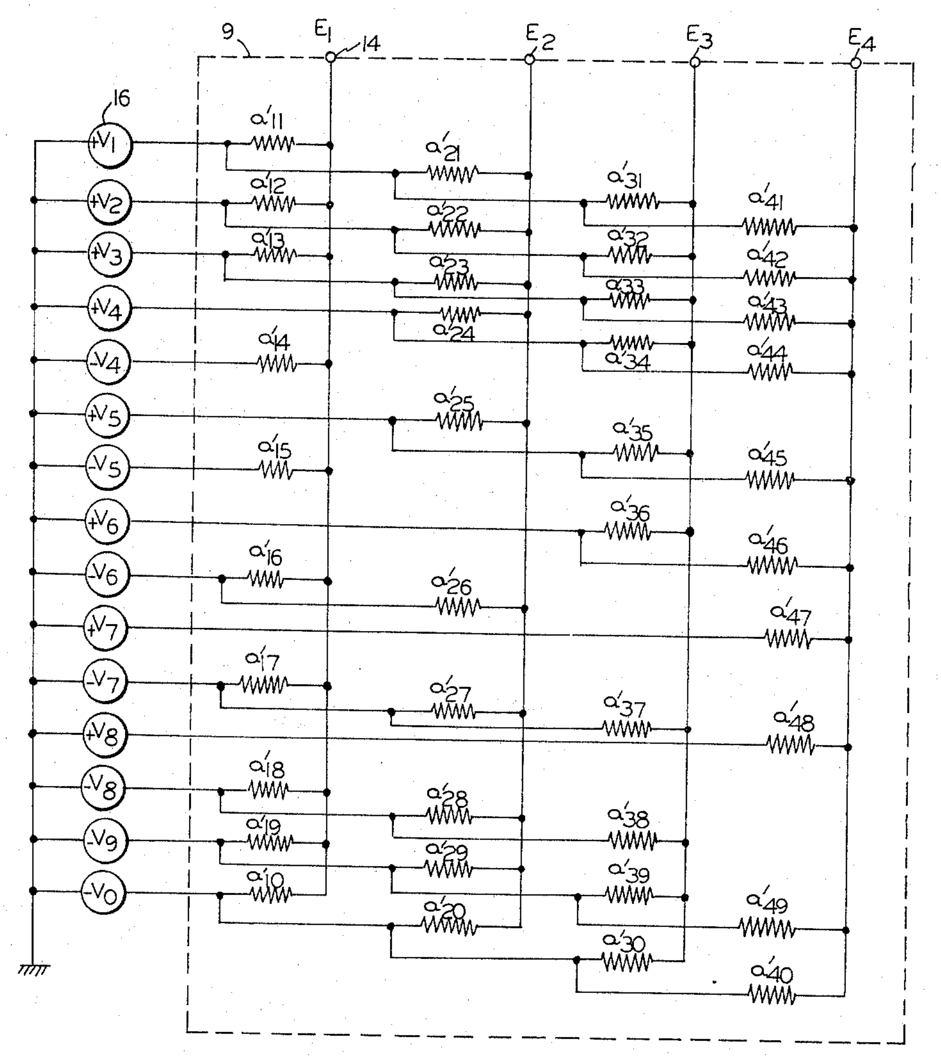

FIGS. *5a–5d* are wave forms illustrating the operation of the clamping circuit of FIG. 4; and FIG. 6 is a circuit diagram of a preferred example of signal conversion means useful for the adjusting system and comprising ten test frequencies and four turnable elements.

An automatic adjusting system according to the invention comprises a mounting head having an input and an output terminal and adjusting means for said tuned amplifier; *n* frequency oscillators generating electric signals of point frequency in the desired passband of the tuned amplifier; *n* first switches scanning said electric signals and sequentially connecting said oscillators to the input terminal of said mounting head; *n* second switches operating synchronously with said first switches; driving means generating a scanning signal for said first and second switches; *n* memory circuits which are sequentially connected to the output terminal of said mounting head by said *n* second switches and which store the amplitude of a detected signal corresponding to each of said electric signals appearing at said output terminal; and signal conversion means for generating adjusting signals be supplied to said adjusting means in association with the output signals of said memory circuits; said adjusting means electro-mechanically adjusting the gain-frequency characteristic (G–*f* characteristic) of said tuned amplifier to a desired pattern.

For convenience, the following description will be made for an automatic adjusting system adapted to tune a tuned amplifier having four tuning elements. However, such description should not be construed as limitative.

Figure 1:
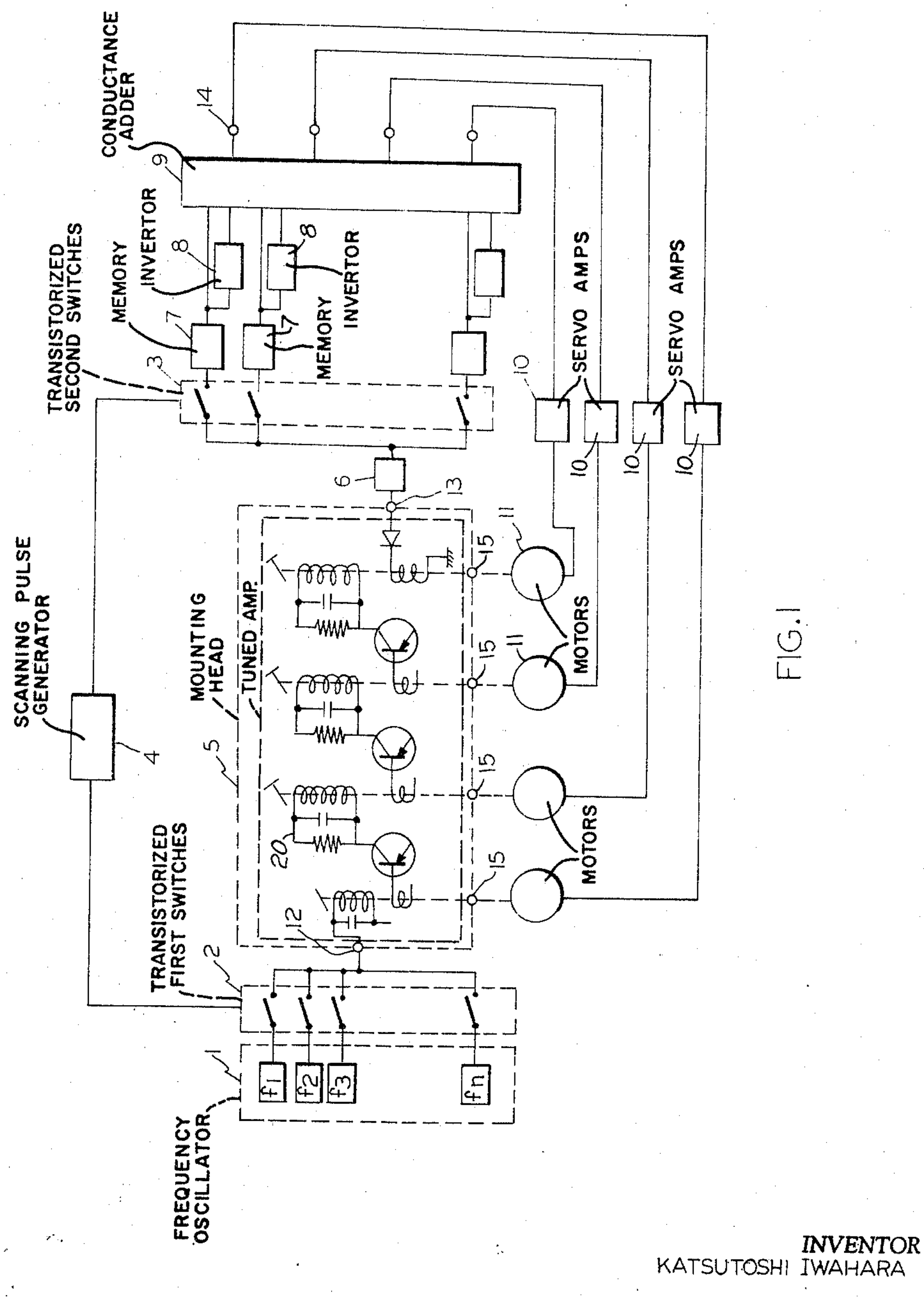

Referring to FIG. 1, each of *n* test frequency oscillators 1 for generating frequencies at various predetermined frequencies spread over the frequency passband of the amplifier to be aligned is connected to a respective one of *n* first switches 2 which are connected in parallel and are connected to an input terminal 12 of a mounting head 5. Said mounting head 5 is provided with a plurality of mechanical adjustable means 15 for adjusting the tuning elements of the tuned amplifier and with an output terminal 13. Said output terminal 13 is connected to a plurality of *n* second switches 3 connected in parallel and each of which is connected to a respective one of *n* memory circuits 7 corresponding to the frequencies generated by frequency oscillators. Each of said *n* memory circuits 7 is connected to signal conversion means 9 directly and through *n* inverting amplifier circuits 8 each of which has a unity gain. Said signal conversion means 9 has a plurality of output terminals 14 which are connected to a plurality of adjusting means 11 coupled to said plurality of mechanical adjustable means 15 for the tuning elements. Said $n$ first switches 2 and said $n$ second switches 3 are driven by driving means 4 capable of scanning synchronously said $n$ first switches 2 and $n$ second switches 3. A tuned amplifier to be adjusted is mounted on said mounting head 5 in such a way that an input terminal and output terminal of said tuned amplifier are connected to said input terminal 12 and said output terminal 13.

Reference characters 6 and 10 designate a D.C. amplifier and a power amplifier, respectively, which will be explained hereinafter.

Electric signals generated by said $n$ test frequency oscillators 1 are scanned by said $n$ first switches 2 and are supplied, as an input signal for the tuned amplifier to be adjusted, which is mounted on said mounting head 5, to said input terminal 12. The input signal supplied to the amplifier through said input terminal 12 is amplified and converted into the detected signal by a diode detector in said amplifier, said detected signal being proportional to a gain corresponding to each of the frequencies of said point frequency oscillators 1 and appearing at said output terminal 13 of said mounting head 5. Said driving means 4 synchronously scans said $n$ first switches 2 and said $n$ second switches 3, and each of said memory circuits 7 stores the detected signal appearing at said second $n$ switches for a time period of one scanning cycle. Therefore said detected signals of pulses proportional to gains of the gain-frequency characteristic are distributed into said memory circuit 7 by said $n$ second switches 3, and are converted into D.C. voltages proportional to gains by said memory circuit 7. Said D.C. voltages are supplied to said signal conversion means 9 and form adjusting signals in association with output voltages of said inverting amplifier circuits 8.

When the gain-frequency characteristic of the amplifier to be adjusted is different from the desired gain-frequency characteristic, i.e. a standard characteristic, at least one of the adjusting signals is not zero. Therefore, the adjusting means 11 are connected to a mechanical adjustable means at 15 to change said tuning element of the amplifier being tuned corresponding to the adjusting signals appearing at output terminals 14. A change in said tuning element due to the output of said adjusting means 11 results in a variation in the gain-frequency characteristic of the amplifier being tuned, which causes a detected signal proportional to the gain of the changed gain-frequency characteristic. Said detected signal due to the changed gain-frequency characteristic is stored by said memory circuits 7 for a time period of the succeeding scanning cycle of said $n$ second switches 3 and is formed into an adjusting signal. Repetition of each scanning cycle causes the gain-frequency characteristic of the tuned amplifier to be changed to the standard characteristic.

For the purpose of making the explanation clear, the tuned amplifier to be adjusted will be assumed to be a four-stage stagger tuned amplifier having a detector circuit and the number of frequencies will be assumed to be ten for the input signals of the amplifier to be adjusted. However, this does not reduce the general nature of this invention. But the number of frequencies and the points in the frequency passband at which they are located can be changed depending on the shape of the gain-frequency characteristic curve. Assume the gain-frequency characteristic of the amplifier having input signal test frequencies at ten points to be $G[q_{r1}, q_{r2}, q_{r3}, q_{r4}, f_{r1}, f_{r2}, f_{r3}, f_{r4}, f]$; where $f_{r1}, f_{r2}, f_{r3}, f_{r4}$ are the resonance frequencies of the resonance circuits of the four stages respectively; $q_{r1}, q_{r2}, q_{r3}, q_{r4}$ are the so-called "Q"or the quality factors of the resonance circuits of the four stages; and $f$ is one of the ten input test frequencies, $f_1, f_2, f_3, \ldots f_{10}$ used as input signals for the amplifier to be adjusted. Resonance frequencies of the standard characteristics of four stages are defined as $f_{0i}$ ($i=1$, 2, 3 and 4). Quality factors corresponding to said $f_{0i}$ are $q_{0i}$ ($i=1$, 2, 3 and 4).

Figure 2A:
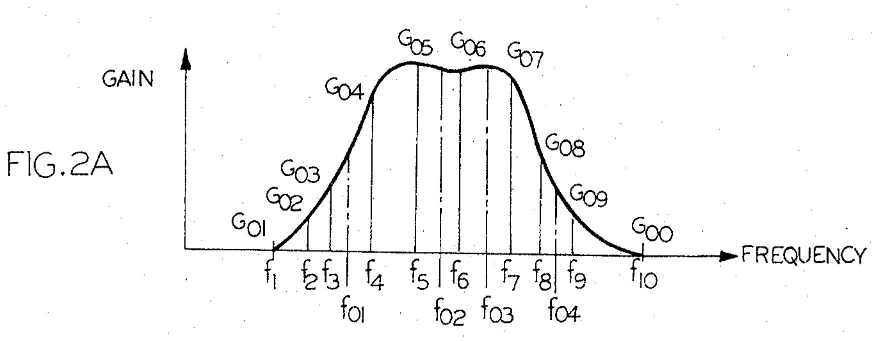
Figure 2B:
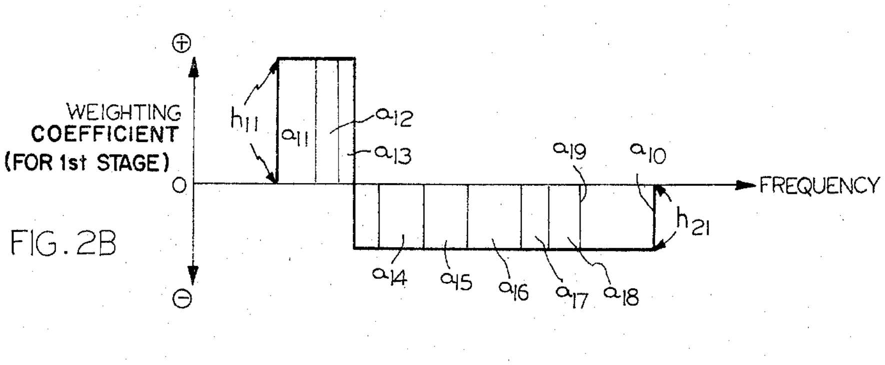
Figure 2C:
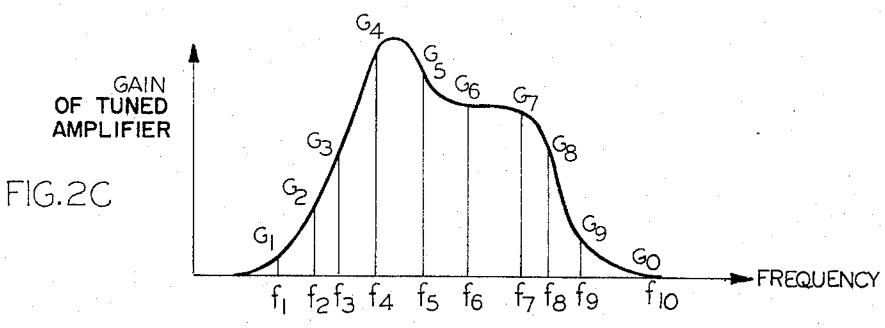

In FIG. 2*c*, the curve shown is a slightly different characteristic curve and the curve in FIG. 2*a* a standard characteristic curve corresponding to the case in which the resonance frequencies $f_{ri}$ are equal to $f_{0i}$ and the equality factors $q_{ri}$ are equal to $q_{0i}$. Therefore, the standard characteristic is written as $G_0[q_{01}, q_{02}, q_{03}, q_{04}, f_{01}, f_{02}, f_{03}, f_{04}, f]$.

The following description will explain a method for determining the weighting coefficient necessary for making the gain frequency characteristic of the tuned amplifier shown in FIG. 2*c* coincident on adjustment with the standard characteristic curve of FIG. 2*a* when only $f_{r1}$ differs from $f_{01}$. The aforesaid adjusting signal generated by the signal conversion means detects how much or in which direction the gain-frequency characteristic of the amplifier to be adjusted deviates from the frequency axis of the standard characteristic and compensates for the deviation. When the deviation does not exist, the information signal, i.e. the adjusting signal disappears. The gain-frequency characteristic curve shown in FIG. 2*c* is obtained when the resonance frequency $f_{01}$ of resonance circuit at the first stage of the tuned amplifier to be adjusted is slightly lower than the $f_{01}$ of the standard gain-frequency characteristic. Therefore, the gains $G_1$, $G_2$ and $G_3$ corresponding to the point frequencies in a frequency passband lower than $f_{01}$ are higher than the gains $G_{01}$, $G_{02}$ and $G_{03}$ of the standard gain-frequency characteristic, respectively. On the other hand, the gains $G_4, G_5, G_6, \ldots, G_0$ in a frequency passband higher than $f_{01}$ are lower than the gain $G_{04}, G_{05}, G_{06}, \ldots, G_{00}$ of the standard gain-frequency characteristic, respectively. Therefore, the following equations hold;

$$\frac{G_1+G_2+G_3}{G_{01}+G_{02}+G_{03}}>1 \tag{1}$$

$$\frac{G_4+G_5+\ldots+G_0}{G_{04}+G_{05}+\ldots+G_{00}}<1 \tag{2}$$

The denominators of the Equations 1 and 2 can be definitely calculated from the standard gain-frequency characteristic and rewritten into the following Equations 3 and 4:

$$h_{11}=\frac{1}{G_{01}+G_{02}+G_{03}}(=a_{11}=a_{12}=a_{13}) \tag{3}$$

$$h_{12}=\frac{1}{G_{04}+G_{05}+\ldots G_{00}}(a_{14}=a_{15}=\ldots=a_{10}) \tag{4}$$

wherein $a_{11}, a_{12}, \ldots, a_{10}$ represent weighting coefficients for the gains corresponding to the test frequencies of the G–$f$ characteristics, respectively. FIG. 2*b* shows a weighting coefficient curve for the first stage of the tuned amplifier which determines the adjusting signal $E_1$ for providing inputs for driving the tuning element in the first stage of the tuned amplifier. The adjusting signal $E_1$ can be calculated by the following Equation 5 which is represented in a matrix notation as shown by Equation 6;

$$E_1=\frac{G_1+G_2+G_3}{G_{01}+G_{02}+G_{03}}-\frac{G_4+\cdots+G_0}{G_{04}+\cdots+G_{00}}=h_{11}(G_1+G_2+G_3)-h_{12}(G_4+\cdots+G_0) \tag{5}$$

$$E_1=[a_{11}, a_{12}, \cdots, a_{10}]\cdot\begin{bmatrix}G_1\\G_2\\\cdot\\\cdot\\\cdot\\G_0\end{bmatrix} \tag{6}$$

In Equation 5, the weighted coefficients $h_{11}$ and $h_{12}$ which are constant respectively can be definitely calculated from the predetermined gains of the standard gain-frequency characteristic.

These constant values $h_{11}$ and $h_{12}$ are multiplied and weighted to the gains corresponding to the point frequencies in a frequency passband lower than $f_{01}$ and the gains corresponding to the point frequencies higher than $f_{01}$, respectively.

Putting Equations 1 and 2 into the Equation 5, one can obtain the following inequality (7).

$$E_1>0$$

The inequality (7) indicates that $E_1$ is positive when the resonance frequency $f_{r1}$ of the resonance circuit in the first stage of the tuned amplifier to be adjusted is lower than the $f_{01}$ predetermined resonance frequency corresponding to the standard G–$f$ characteristic. When there is no difference between the G–$f$ characteristic of the amplifier to be adjusted and the standard G–$f$ characteristic, $E_1$ is zero.

An increase in the resonance frequency at the first stage causes $E_1$ to be negative. Therefore, $E_1$ can be used as an adjusting signal for the first stage of the tuned amplifier to be adjusted. The present description has been given for a system having, for example, four tuning elements. It is not profitable to change the four tuning elements only by $E_1$. It is necessary to have four adjusting signals for four adjusting variable members. The following description will explain the novel adjusting method with reference to FIG. 3 when $f_{r1}$, $f_{r2}$, $f_{r3}$ and $f_{r4}$ differ from $f_{01}$, $f_{02}$, $f_{03}$ and $f_{04}$, respectively.

The adjusting signals for each stage of the tuned amplifier to be adjusted can be calculated with reference to FIG. 3 as follows:

$$E_1=h_{11}(G_1+G_2+G_3)-h_{12}(G_4+ \dots +G_0) \quad (5')$$

where $$h_{11}=\frac{1}{G_{01}+G_{02}+G_{03}} \quad (3')$$

$$h_{12}=\frac{1}{G_{04}+ \dots +G_{00}} \quad (4')$$

$$E_2=h_{21}(G_1+G_2+ \dots +G_5)-h_{22}(G_6+G_7+ \dots +G_0) \quad (8)$$

where $$h_{21}=\frac{1}{G_{01}+G_{02}+ \dots +G_{05}} \; (=a_{21}= \dots =a_{25}) \quad (9)$$

$$h_{22}=\frac{1}{G_{06}+G_{07}+ \dots +G_{00}} \; (=a_{26}= \dots =a_{20}) \quad (10)$$

and $$E_3=h_{31}(G_1+G_2+ \dots +G_6)-h_{32}(G_7+G_8+ \dots +G_{00}) \quad (11)$$

where $$h_{31}=\frac{1}{G_{01}+G_{02}+ \dots +G_{06}} \; (=a_{31}= \dots =a_{36}) \quad (12)$$

$$h_{32}=\frac{1}{G_{07}+G_{08}+ \dots +G_{00}} \; (=a_{37}= \dots =a_{30}) \quad (13)$$

and $$E_4=h_{41}(G_1+G_2+ \dots +G_8)-h_{42}(G_9+G_0) \quad (14)$$

where $$h_{41}=\frac{1}{G_{01}+G_{02}+ \dots +G_{08}} \; (=a_{41}= \dots =a_{48}) \quad (15)$$

$$h_{42}=\frac{1}{G_{09}+G_{00}} \; (=a_{49}=a_{40}) \quad (16)$$

These equations can be represented in a matrix notation as follows;

$$[E_i]=[a_{ij}]\cdot[G_j] \quad (17)$$

where $i=1, 2, 3, 4$ $j=1, 2, 3, \dots, 9, 0$

The resonance frequency $f_{ri}$ and the quality factor $q_{ri}$ of each of the resonance circuits are not always coincident with $f_{0i}$ ($i=1, 2, 3, 4$) and $q_{0i}$ ($i=1, 2, 3, 4$) of the standard G–$f$ characteristic respectively even when there exists coincidence between the G–$f$ characteristic of the amplifier to be adjusted and the standard G–$f$ characteristic.

However, $E_i$ is zero when the G–$f$ characteristic of the tuned amplifier to be adjusted is coincident with the standard G–$f$ characteristic.

A decrease in the resonance frequency at each stage causes $E_i$ to be positive. An increase in the resonance frequency causes $E_i$ to be negative. On the other hand, the four adjusting signals are produced according to the weighted gains of the G–$f$ characteristic. Therefore, it is important that there be correlations between the adjusting signals and tuning elements which have an effect on the G–$f$ characteristic when the four tuning elements are simultaneously changed and driven. The conditions for $E_1=0$ in Equation 5 can be obtained when the denominators in the first and second term are equal to the numerators in the first and second terms respectively, that is, the G–$f$ characteristic of the tuned amplifier to be adjusted is coincident with that of the standard G–$f$ characteristic. In addition, the condition $E_1=0$ in Equation 5 holds when the ratio of the denominator to the numerator in the first term is equal to that in the second term, that is, the G–$f$ characteristic of the tuned amplifier to be adjusted is similar in gain to the standard G–$f$ characteristic.

As a practical matter, the G–$f$ characteristic of the tuned amplifier differs slightly with respect to the gain from the standard G–$f$ characteristic.

$E_1$ varies in any particular vicinity depending mainly on $f_{r1}$. On the other hand, it is also noteworthy that the $E_1$ values obtained in the above way are less correlated with each other. Therefore, it is reasonable to utilize the value $E_i$ which is given by Equation 17. When all of the $E_i$ signals become equal to zero, the gain-frequency characteristic is equal or similar in the gain to the standard G–$f$ characteristic.

In this system, when the quality factor of each stage of the amplifier to be adjusted is not equal to a designed value corresponding to the standard characteristic, there is no exact coincidence between the gain-frequency characteristic and the standard characteristic even in the case where $E_i=0$. A condition for $E_i=0$ in Equations 5′, 8, 11 and 14 can be similarly obtained when the first and second terms in these equations become one, respectively; that is the gain-frequency characteristic of the tuned amplifier to be adjusted is coincident with the standard gain-frequency characteristic. In addition, the condition $E_i=0$ holds when the first and second terms are not equal to one but are equal to each other, respectively; that is, the gain-frequency characteristic of the tuned amplifier to be adjusted is similar in gain to the standard gain-frequency characteristic. However, the difference therebetween is very small. It is necessary for the achievement of this system that each of the resonance frequencies is required not to differ extensively from its standard value corresponding to the standard characteristic. However, the requirement can be satisfied by, for example, adjusting roughly, at the initial step, the resonance frequency of each of the tuning circuits 20 in FIG. 1.

When the adjusting signals generated at said signal conversion means 9 is not strong enough to drive said adjusting means 11, the adjusting signals can be amplified by power amplifiers 10, such as servo amplifiers installed in advance of said adjusting means 11.

Said adjusting means 11 can be any available and suitable equipment, preferably servo motors, the shafts of which are coupled to the means for the adjusting tuning elements as mechanical adjusting means 15.

Said $n$ first switches 2 and $n$ second switches 3 can be made from any available rotary switch relay having mechanical contacts. However, such a rotary switch relay may not be satisfactory with respect to the scanning time, life, and reliability. It is preferred to use, for said $n$ first switches 2 and $n$ second switches 3, electronic switches such as transistor switches.

Said driving means 4 comprises any suitable means for scanning synchronously said $n$ first switches 2 and $n$ second switches 3, and preferably comprises a scanning pulse generator having $n$ channel outputs. There are three possible types of scanning pulse generators when electronic switches are used for said $n$ first switches 2 and $n$ second switches 3;

(1) a scanning pulse generator utilizing a shift register
(2) a scanning pulse generator using a ring counter and
(3) a scanning pulse generator employing a clock pulse generator, a binary counter and a diode matrix.

Among these three types, the most preferable is a scanning pulse generator employing a clock pulse generator, a binary counter and a diode matrix.

When the detected signal appearing at the output terminal 13 is weak, the detected signal can be amplified by using a D.C. amplifier 6 installed in advance of the second $n$ switches 3.

The tuned amplifier to be adjusted by the present adjusting system is usually provided with a D.C. bias voltage applied to the amplifying circuit when the amplifying circuit is composed of a transistor circuit. When the D.C. bias voltage is superposed on the detected signal, it is desirable to split the D.C. bias voltage and the detected signal and to amplify them independently of each other. In such a case, said D.C. amplifier 6 must be replaced by a clamping circuit comprising an A.C. amplifier in accordance with the present invention. Said A.C. component of the detected signal is amplified by the A.C. amplifier and removes the D.C. voltage and the D.C. bias component of the detected signal. The removed D.C. component of the detected signal can be restored by the clamping circuit for D.C. restoration.

Referring to FIG. 4, the clamping circuit has an input terminal 30 and an output terminal 35. Said input terminal 30 is connected to an A.C. amplifier 32 through a blocking capacitor 31 for blocking the D.C. component of the detecting signal and the D.C. bias voltage. Said output terminal 35 is connected to said A.C. amplifier 32 through a capacitor 34. Said A.C. amplifier 32 has a ground 38. A junction point 41 between said capacitor 34 and said output terminal 35 is connected to said ground 38 through a transistor 36 which is supplied with a driving signal at the base thereof from a signal supplying terminal 37. Voltage wave forms appearing at said input terminal 30, a junction point 40 between said A.C. amplifier 32 and said capacitor 34, said supplying terminal 37 and said output terminal 35 are shown in FIGS. *5a*, *b*, *c* and *d* respectively.

A signal composed of a D.C. bias voltage and a detected signal superposed thereon is supplied to said input terminal 30 and removed the D.C. bias voltage by said blocking capacitor 31 and then is amplified by said A.C. amplifier 32 as shown in FIG. *5b*. Said supplying terminal 37 is supplied with a driving signal having a wave form as shown in FIG. *5c*. Said driving signal is designed to produce a negative voltage during the presence of the detected signal and a positive voltage during the absence of the detected signal. Said transistor 36 is in an on-state for the duration of the positive voltage of said driving signal and is in an off-state for the duration of the negative voltage of said driving signal. Therefore, said output terminal 35 is supplied with a signal having a D.C. voltage restored as shown in FIG. *5d*. In such a way, said output terminal 35 is provided with a detected signal proportional to each of the test frequencies for determining the G–$f$ characteristic of the tuned amplifier to be adjusted.

The following description explains the procedure for obtaining adjusting signals suitable for driving mechanical adjustable means 15.

Each of the weighting coefficients can be obtained by introducing each of the gains corresponding to the test frequencies of a standard gain-frequency characteristic into Equations 9, 10, 12, 13, 15 and 16 in a manner mentioned previously, As a practical matter, the weighting coefficients $h'_{11}$, $h'_{12}$, $h'_{21}$ . . . and $h'_{42}$ are usually decided by detected signals $v_{01}$, $v_{02}$, $v_{03}$ . . . and $v_{00}$ proportional to gains $G_{01}$, $G_{02}$, $G_{03}$, . . . and $G_{00}$ of the standard characteristic in the following manner;

$$h'_{11}=\frac{1}{v_{01}+v_{02}+v_{03}}\ (=a'_{11}=\cdots=a'_{13}) \quad (18)$$

$$h'_{12}=\frac{1}{v_{04}+\cdots+v_{00}}\ (=a'_{14}=\cdots=a'_{10}) \quad (19)$$

$$h'_{21}=\frac{1}{v_{01}+\cdots+v_{05}}\ (=a'_{21}=\cdots=a'_{25}) \quad (20)$$

$$h'_{22}=\frac{1}{v_{06}+\cdots+v_{00}}\ (=a'_{26}=\cdots=a'_{20}) \quad (21)$$

$$h'_{31}=\frac{1}{v_{01}+\cdots+v_{06}}\ (=a'_{31}=\cdots=a'_{36}) \quad (22)$$

$$h'_{32}=\frac{1}{v_{07}+\cdots+v_{00}}\ (=a'_{37}=\cdots=a'_{30}) \quad (23)$$

$$h'_{41}=\frac{1}{v_{01}+\cdots+v_{08}}\ (=a'_{41}=\cdots=a'_{48}) \quad (24)$$

$$h'_{42}=\frac{1}{v_{09}+v_{00}}\ (=a'_{49}=a'_{40}) \quad (25)$$

The adjusting signal $E_1$ of the Equation 5 can be rewritten as the following Equation 26 when $v_1$, $v_2$, . . . and $v_0$ express the detected signal proportional to gains $G_1$, $G_2$, . . . $G_0$ of the test frequencies of the tuned amplifier to be adjusted:

$$E'_1=\frac{v_1+v_2+v_3}{v_{01}+v_{02}+v_{03}}-\frac{v_4+v_5+\cdots v_0}{v_{04}+\cdots+v_{00}}= h_{11}'(v_1+v_2+v_3)-h_{12}'(v_4+v_5+\cdots+v_0) \quad (26)$$

Similarly, the adjusting signals at various stages can be written as the following equations:

$$E'_2=h'_{21}(v_1+v_2+\cdots+v_5)-h'_{22}(v_6+v_7+\cdots+v_0) \quad (27)$$

$$E'_3=h'_{31}(v_1+v_2+\cdots+v_6)-h'_{32}(v_7+v_8+\cdots+v_0) \quad (28)$$

$$E'_4=h'_{41}(v_1+v_2+\cdots+v_0)-h'_{42}(v_9+v_0) \quad (29)$$

Such relations can be expressed in a matrix notation in the following way:

$$[E'_1]=[a'_{ij}]\cdot[v_j]$$

where $i=1, 2, 3, 4$
$j=1, 2, 3, \ldots 9, 0$

FIG. 6 indicates a preferred example of signal conversion means 9 useful in an adjusting system having ten test frequencies and four tuning elements.

Referring to FIG. 1 and FIG. 6, reference character 16 designates D.C. voltage sources which are proportional to gains of the G–$f$ characteristic of the tuned amplifier to be adjusted and which appear at the aforesaid memory circuits 7 and inverting amplifier circuits 8 with unity gain. Said inverting amplifier circuits 8 are circuits for changing the polarity of the output voltages of said memory circuits 7.

Figure 3:
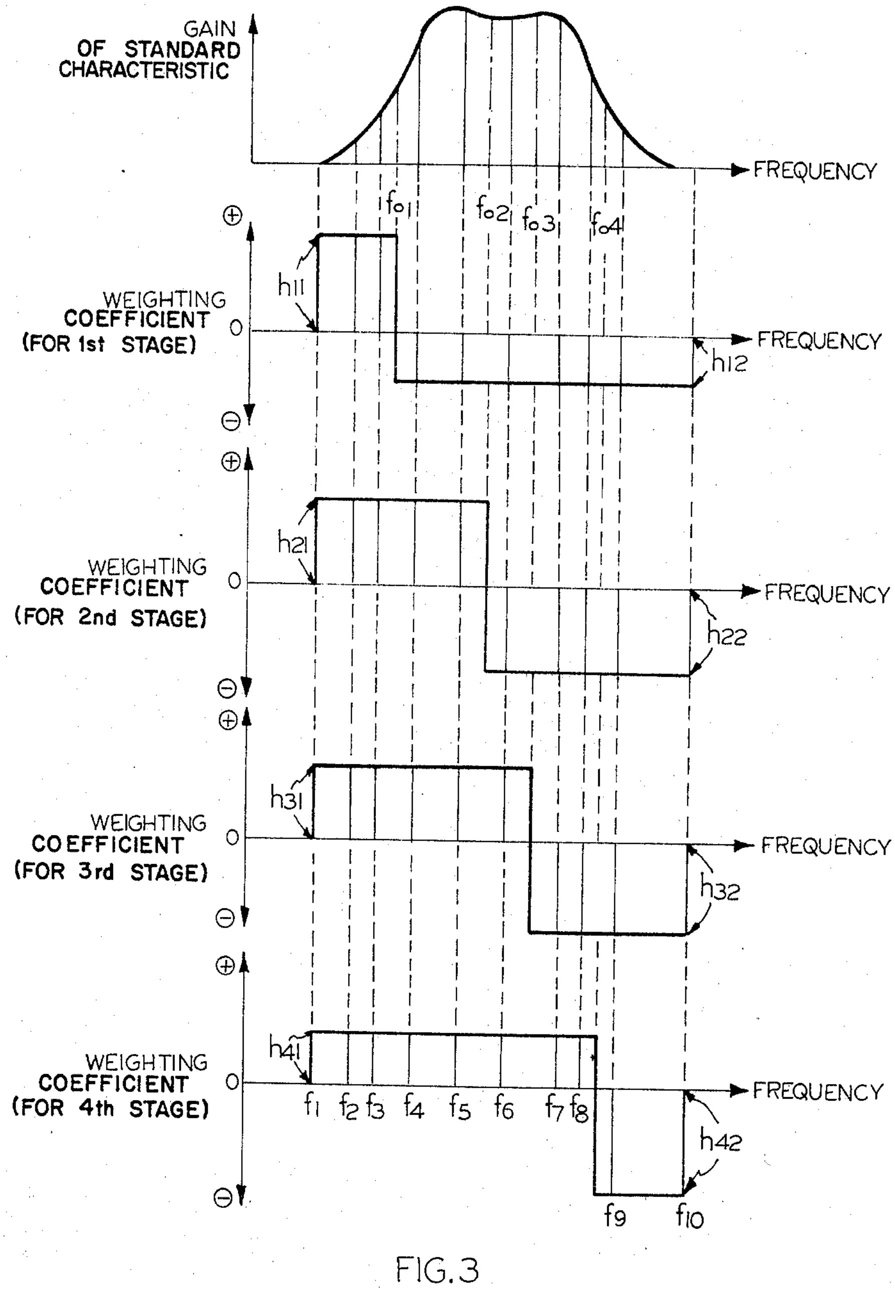
FIG. 3 illustrates the curves of the weighted coefficients at various adjusting stages for producing adjusting signals.

Each of the weighting coefficients shown in FIG. 3 is positive in the frequency range below $f_{01}$, and negative above $f_{01}$. However, the weighting coefficients of each of the weighting coefficients can not have the polarity changed by the resistor network shown in FIG. 6. The system of FIG. 6 is designed to utilize the voltage of a similar or opposite polarity to the output voltages of said memory circuits 7 and to produce an effect similar to that obtained by changing the polarity of the weighting coefficients. As a practical matter, it is not necessary that all of the output voltages of memory circuits 7 corresponding to the test frequencies have the polarity changed by the inverting amplifier 8 with unity gain. Therefore, it is necessary that the output voltages of memory circuits 7 corresponding to the test frequencies in the frequency pass band lower than $f_{01}$ be positive. There are required both negative and positive voltages for the output voltages of said memory circuits 7 in the frequency range between $f_{01}$ and $f_{04}$. In the frequency range higher than $f_{04}$, there is required only a negative voltage for the output voltages of said memory circuits 7.

Assume that said weighting coefficients $a_{ij}$ ($i=1, 2, 3$ and $4$, $j=1, 2, 3, \ldots 9$ and $0$) represent the conductance. The output $E''_1$ of a conductance adder circuit comprising conductance network is expressed by the following Equation 31:

$$E''_1=\frac{a'_{11}\cdot v_1+a'_{12}\cdot v_2+a'_{13}\cdot v_3-a_{14}\cdot v_4-\cdots-a'_{10}\cdot v_0}{a'_{11}+a'_{12}\cdots+a'_{10}}=\frac{1}{K}[h'_{11}(v_1+v_2+v_3)-h'_{12}(v_4+\cdots+v_0)] \qquad (31)$$

where $$K=a'_{11}+a'_{12}+\ldots+a'_{10}$$

Therefore, the adjusting signal $E''_1$ becomes a voltage proportional to the adjusting signal $E'_1$ of the Equation 26. Similarly, further adjusting signals $E''_2$, $E''_3$ and $E''_4$ can be obtained.

The thus produced adjusting signals are amplified by a power amplifier 10, if necessary, and adjust driving means 11, e.g. rotational angles of electric servo motors, coupled as mechanical adjusting means 15 to the tuning elements so that the G–$f$ characteristic of the tuned amplifier to be adjusted approaches the standard characteristic.

It should be understood that this invention is not limited to the specific examples herein illustrated and described.

What I claim is:

1. An automatic adjusting system for adjusting a tuned amplifier having tuning means comprising, a mounting head having an input and an output terminal and adjusting means for adjusting the tuning means of said amplifier, $n$ test frequency oscillators each generating an electric signal, $n$ first switches for scanning said electric signals and sequentially connecting the respective oscillators to the input terminal of said mounting head, $n$ second switches adapted to operate synchronously with said first switches, driving means coupled to said first and second switches and generating a scanning signal for said first and second switches, $n$ memory circuits sequentially connected to the output terminal of said mounting head by said $n$ second switches and storing the amplitude of a detected signal corresponding to the respective electric signals appearing at said output terminal, signal conversion means coupled to said memory circuits and said adjusting means for generating adjusting signals and supplying them to said adjusting means from the output signals of said memory circuits, said adjusting means comprising means for electro-mechanically adjusting the tuning means of the amplifier to adjust the gain-frequency characteristics of said tuned amplifier to a desired pattern.

2. An automatic adjusting system as claimed in claim 1, wherein said signal conversion means comprises a conductance circuit which sums up the output voltages of said memory circuits according to a weighting coefficient, said weighting coefficient being selected so that the polarity of the output voltages of said conductance circuit determines the direction of adjustment of said adjusting means.

3. An automatic adjusting system as claimed in claim 2, wherein said signal conversion means further comprises inverting amplifiers of unity gain coupled to said memory circuits and said conductance adder circuit and comprising a conductance network coupled to said memory circuits and said inverting amplifiers.

4. An automatic adjusting system, as claimed in claim 1, wherein said $n$ first switches comprise electronic switching means.

5. An automatic adjusting system as claimed in claim 4 wherein said electronic switching means are transistor switches.

6. An automatic adjusting system as claimed in claim 1, wherein said $n$ second switches comprise electronic switching means.

7. An automatic adjusting system as claimed in claim 6 wherein said electronic switching means are transistor switches.

8. An automatic adjusting system as claimed in claim 1, which additionally comprises a clamping circuit for D.C. restoration connected between said output terminal of said mounting head and said $n$ second switches and comprising a capacitor and an electronic switching circuit.

9. An automatic adjusting system as claimed in claim 8, wherein said clamping circuit additionally comprising an A.C. amplifier connected between said output terminal of said mounting head and said special clamping circuit so as to amplify small detected signals.

10. An automatic adjusting system as claimed in claim 1, wherein said adjusting means comprises an electric servo motor and an adjusting driver which drives the servo motor and an adjusting driver which drives the tuning means of said tuned amplifier, said electric servo said adjusting driver.

11. An automatic adjusting system as claimed in claim 10, wherein said adjusting means additionally comprise servo amplifiers connected between said output terminal of said signal conversion means and said adjusting means so as to amplify a small adjusting signal.

References Cited

UNITED STATES PATENTS

| | | | |
|---|---|---|---|
| 2,978,647 | 4/1961 | Lehmann | 330—2 |
| 2,978,655 | 4/1961 | Fernsler | 330—2 X |

ROY LAKE, Primary Examiner

J. B. MULLINS, Assistant Examiner

U.S. Cl. X.R.

334—26